US010565550B1

(12) United States Patent
Gowda (10) Patent No.: US 10,565,550 B1
(45) Date of Patent: Feb. 18, 2020

(54) REAL TIME SCANNING OF A RETAIL STORE (71) Applicant: Target Brands, Inc., Minneapolis, MN (US)

(72) Inventor: Yeshwanth M. Gowda, Walnut Creek, CA (US)

(73) Assignee: Target Brands, Inc., Minneapolis, MN (US)

(*) Notice: Subject to any disclaimer, the term of this patent is extended or adjusted under 35 U.S.C. 154(b) by 231 days.

(21) Appl. No.: 15/696,390

(22) Filed: Sep. 6, 2017

Related U.S. Application Data (60) Provisional application No. 62/384,321, filed on Sep. 7, 2016.

(51) Int. Cl.
G06Q 10/08 (2012.01)
H04N 13/204 (2018.01)
H04N 13/271 (2018.01)
H04W 64/00 (2009.01)
H04W 84/12 (2009.01)
H04N 13/257 (2018.01)
G06Q 20/12 (2012.01)

(52) U.S. Cl.
CPC ......... *G06Q 10/087* (2013.01); *H04N 13/204* (2018.05); *H04N 13/271* (2018.05); *G06Q 20/123* (2013.01); *H04N 13/257* (2018.05); *H04W 64/00* (2013.01); *H04W 84/12* (2013.01)

(58) Field of Classification Search
CPC .. H04N 13/271; H04N 13/204; H04N 13/257; G06Q 10/087; H04W 64/00; H04W 84/12
USPC .......................................................... 705/28
See application file for complete search history.

(56) References Cited

U.S. PATENT DOCUMENTS

| 4,071,740 A | 1/1978 | Gogulski |
| 4,973,952 A | 11/1990 | Malec et al. |
| 5,287,266 A | 2/1994 | Malec et al. |
| 5,295,064 A | 3/1994 | Malec et al. |
| 5,729,697 A | 3/1998 | Schkolnick et al. |
| 5,773,954 A | 6/1998 | VanHorn |
| 5,821,512 A | 10/1998 | O'Hagan et al. |
| 5,821,513 A | 10/1998 | O'Hagan et al. |
| 5,995,015 A | 11/1999 | DeTemple et al. |
| 6,032,127 A | 2/2000 | Schkolnick et al. |
| 6,598,025 B1 | 7/2003 | Hamilton et al. |
| 6,659,344 B2 * | 12/2003 | Otto ............... G06K 17/0022 235/381 |
| 6,997,382 B1 | 2/2006 | Bhri |

(Continued)

Primary Examiner — Florian M Zeender
Assistant Examiner — Nicole Elena Bruner
(74) Attorney, Agent, or Firm — Leanne Taveggia Farrell; Westman, Champlin & Koehler, P.A.

(57) ABSTRACT

A scanning system for a retail store includes a plurality of electric beacons located in aisles in a retail store A plurality of shopping carts having on board 3D scanning components are configured to scan items along aisles in a retail store, collect and process 3D information and transmit the 3D information to a store server. Each of the plurality of shopping carts include 3D cameras for 3D scanning, sensors for sensing the electric beacons, at least one processor and a communications module for remotely communicating with the store server. The store server is configured to gather the 3D information transmitted from the plurality of shopping carts to generate a 3D model of the retail store.

16 Claims, 6 Drawing Sheets

(56) References Cited

U.S. PATENT DOCUMENTS

| | | | |
|---|---|---|---|
| 7,178,719 B2 | 2/2007 | Silverbrook et al. | |
| 7,183,910 B2 | 2/2007 | Alvarez et al. | |
| 7,225,980 B2 | 6/2007 | Ku et al. | |
| 7,364,070 B2 | 4/2008 | Chang | |
| 7,443,295 B2 | 10/2008 | Brice et al. | |
| 7,580,699 B1 | 8/2009 | Shaw et al. | |
| 7,660,747 B2 | 2/2010 | Brice et al. | |
| 7,679,522 B2 | 3/2010 | Carpenter | |
| 7,714,723 B2 | 5/2010 | Fowler et al. | |
| 7,741,808 B2 | 6/2010 | Fowler et al. | |
| 7,762,458 B2 | 7/2010 | Stawar et al. | |
| 7,782,194 B2 | 8/2010 | Stawar et al. | |
| 7,828,211 B2 | 11/2010 | Landers, Jr. et al. | |
| 8,152,062 B2 | 4/2012 | Perrier et al. | |
| 8,208,014 B2 | 6/2012 | Geiger et al. | |
| 8,254,881 B2 | 8/2012 | Shaw et al. | |
| 8,630,924 B2 | 1/2014 | Groenevelt et al. | |
| 8,720,778 B2 | 5/2014 | Chen et al. | |
| 8,938,396 B2 | 1/2015 | Swafford, Jr. et al. | |
| 8,950,671 B2 | 2/2015 | Chan et al. | |
| 8,972,285 B2 | 3/2015 | Soldate | |
| 9,230,249 B1 | 1/2016 | Vora | |
| 9,269,093 B2 | 2/2016 | Lee et al. | |
| 9,288,268 B2 | 3/2016 | Ramaswamy et al. | |
| 10,002,337 B2* | 6/2018 | Siddique | G06Q 10/0637 |
| 10,126,747 B1* | 11/2018 | Svec | G05B 19/4189 |
| 10,318,907 B1* | 6/2019 | Bergstrom | H04N 5/232 |
| 2003/0216969 A1* | 11/2003 | Bauer | G06K 7/0008 |
| | | | 705/22 |
| 2005/0131578 A1* | 6/2005 | Weaver | G01G 19/4144 |
| | | | 700/244 |
| 2007/0260429 A1* | 11/2007 | Vera | G08B 13/1961 |
| | | | 702/188 |
| 2008/0077511 A1* | 3/2008 | Zimmerman | G06Q 10/00 |
| | | | 705/28 |
| 2009/0094140 A1* | 4/2009 | Kwan | G06Q 10/087 |
| | | | 705/28 |
| 2009/0231135 A1* | 9/2009 | Chaves | G06Q 10/087 |
| | | | 340/572.1 |
| 2010/0156597 A1* | 6/2010 | Stern | G06K 7/0008 |
| | | | 340/5.92 |
| 2010/0171826 A1* | 7/2010 | Hamilton | G06Q 30/06 |
| | | | 348/135 |
| 2011/0143779 A1* | 6/2011 | Rowe | G06Q 30/02 |
| | | | 455/456.3 |
| 2012/0019393 A1* | 1/2012 | Wolinsky | G06Q 30/02 |
| | | | 340/686.1 |
| 2012/0091162 A1* | 4/2012 | Overhultz | A47F 1/126 |
| | | | 221/1 |
| 2012/0193408 A1* | 8/2012 | Shastri | G06Q 10/00 |
| | | | 235/375 |
| 2013/0103608 A1* | 4/2013 | Scipioni | G06Q 30/02 |
| | | | 705/346 |
| 2013/0235206 A1* | 9/2013 | Smith | H04N 7/181 |
| | | | 348/150 |
| 2014/0244207 A1* | 8/2014 | Hicks | G01C 3/00 |
| | | | 702/150 |
| 2015/0127496 A1* | 5/2015 | Marathe | G06Q 10/087 |
| | | | 705/28 |
| 2015/0178565 A1* | 6/2015 | Rivlin | G06T 7/246 |
| | | | 382/103 |
| 2015/0310539 A1* | 10/2015 | McCoy | G06Q 30/0641 |
| | | | 705/27.1 |
| 2015/0317682 A1* | 11/2015 | Kayser | G01G 19/4144 |
| | | | 705/14.55 |
| 2016/0171432 A1* | 6/2016 | Pugh | G06Q 10/087 |
| | | | 705/14.23 |
| 2016/0258763 A1* | 9/2016 | High | E01H 5/12 |
| 2016/0260148 A1* | 9/2016 | High | E01H 5/12 |
| 2016/0314518 A1* | 10/2016 | Goodwin | G06Q 30/0637 |
| 2017/0142373 A1* | 5/2017 | Black | G06Q 10/087 |
| 2017/0221130 A1* | 8/2017 | Kraus | G06Q 30/0633 |
| 2017/0323281 A1* | 11/2017 | Jones | G06Q 20/202 |
| 2017/0323359 A1* | 11/2017 | Dey | G07G 1/0072 |
| 2017/0344937 A1* | 11/2017 | Atchley | G01G 19/52 |
| 2017/0357939 A1* | 12/2017 | Jones | G06K 9/00671 |
| 2018/0114183 A1* | 4/2018 | Howell | G06Q 10/087 |
| 2018/0365630 A1* | 12/2018 | Seals | G06Q 10/087 |

\* cited by examiner

REAL TIME SCANNING OF A RETAIL STORE

CROSS-REFERENCE TO RELATED APPLICATION

The present application is based on and claims the benefit of U.S. provisional patent application Ser. No. 62/384,321, filed Sep. 7, 2016, the content of which is hereby incorporated by reference in its entirety.

BACKGROUND

A three-dimensional (3D) scanner is a device that analyzes a real-world object or environment to collect data on its shape and appearance. The data collected is then used to generate a digital three-dimensional (3D) model. One example of a 3D scanner is a non-contact scanner that emits some light, such as infrared light, and detects reflected light from the object being scanned.

The discussion above is merely provided for general background information and is not intended to be used as an aid in determining the scope of the claimed subject matter.

SUMMARY

A scanning system for a retail store includes a plurality of electric beacons located in aisles in a retail store A first electric beacon is located at a first end of an aisle and a second electric beacon is located at a second end of the aisle. A plurality of shopping carts having on board 3D scanning components are configured to scan items along aisles in a retail store, collect and process 3D information and transmit the 3D information to a store server. Each of the plurality of shopping carts include 3D cameras for 3D scanning, sensors for sensing the electric beacons, at least one processor and a communications module for remotely communicating with the store server. The store server is configured to gather the 3D information transmitted from the plurality of shopping carts to generate a 3D model of the retail store. The 3D information being collected by each shopping cart is collected when the shopping cart senses one of the first or the second electric beacon in the aisle and each shopping cart stops collecting 3D information when the shopping cart senses the other of the first or the second electric beacon in the aisle.

A method of scanning an aisle in a retail store is provided. An indication from a sensor is received indicating that a shopping cart having on board 3D scanning components has entered an aisle. It is determined whether a second shopping cart having on board 3D scanning components is located within a threshold radius from the shopping cart, whether the second shopping cart is heading in a direction towards the shopping cart and whether a threshold amount of time has occurred from when the aisle was last 3D scanned. The aisle is 3D scanned if there is no other shopping carts within the threshold radius and the aisle has not been scanned in the threshold amount of time or if the second shopping cart is within the threshold radius, but is heading in an opposing direction and the aisle has not been scanned in the threshold amount of time.

A scanning system for a retail store includes a plurality of item electric beacons located in proximity to different types of items in an aisle. Each of the item electric beacons are activated upon the type of item being out-of-stock or low on stock. A plurality of shopping carts have on board scanning components for sensing the electric beacons in the aisle. Each of the plurality of shopping carts include at least one visual camera for taking photographs, sensors for sensing the item electric beacons, at least one processor and a communications module for remotely communicating with a store server. When one of the sensors senses one of the electric beacons, the visual camera takes a photograph of the type of item and its surrounding area and transmits the photograph to the store server so that stock is replenished.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Described below is a system for a fleet of customer-driven shopping carts equipped with 3D scanning equipment and components that when being pushed around a retail store provide real time data for the construction of and updating of a 3D map or model for implementation in a 3D virtual shopping environment. A virtual shopping environment may be accessed in many different ways including being published to a website or being placed on a virtual reality application. In this way, a customer may shop in the retail store in real-time using a user device, such as a mobile device including a virtual reality device mounted to a person's head or a personal computer, without the customer actually having to be in the store. Another way to utilize the generated 3D map or model is to give it to store planners or in-store team members who are in need of modifying 3D space in the store. In yet another embodiment, the fleet of customer-driven shopping carts equipped with 3D scanning equipment or components can be used to detect out-of-stock items in the aisles and then instantly notify team members in the store when items need to be quickly replenished.

To generate a 3D map or model, each customer-driven shopping cart in the fleet is equipped with 3D cameras and other types of sensors and cameras located in sensor pods or packages on a front of the shopping cart and the sides of the shopping cart. Each customer-driven shopping cart may also be equipped with a graphic processing unit, a central processing unit, a memory, a Wi-Fi module, an application running on the central processing unit to connect to a cloud, an accelerometer, a gyroscope, LIDAR (Light Detection and Ranging) and a power pack. Many of these components will be hidden underneath the bottom of the cart and will provide orientation information, obstacle detection and compass direction on where the cart is being directed.

Figure 1:
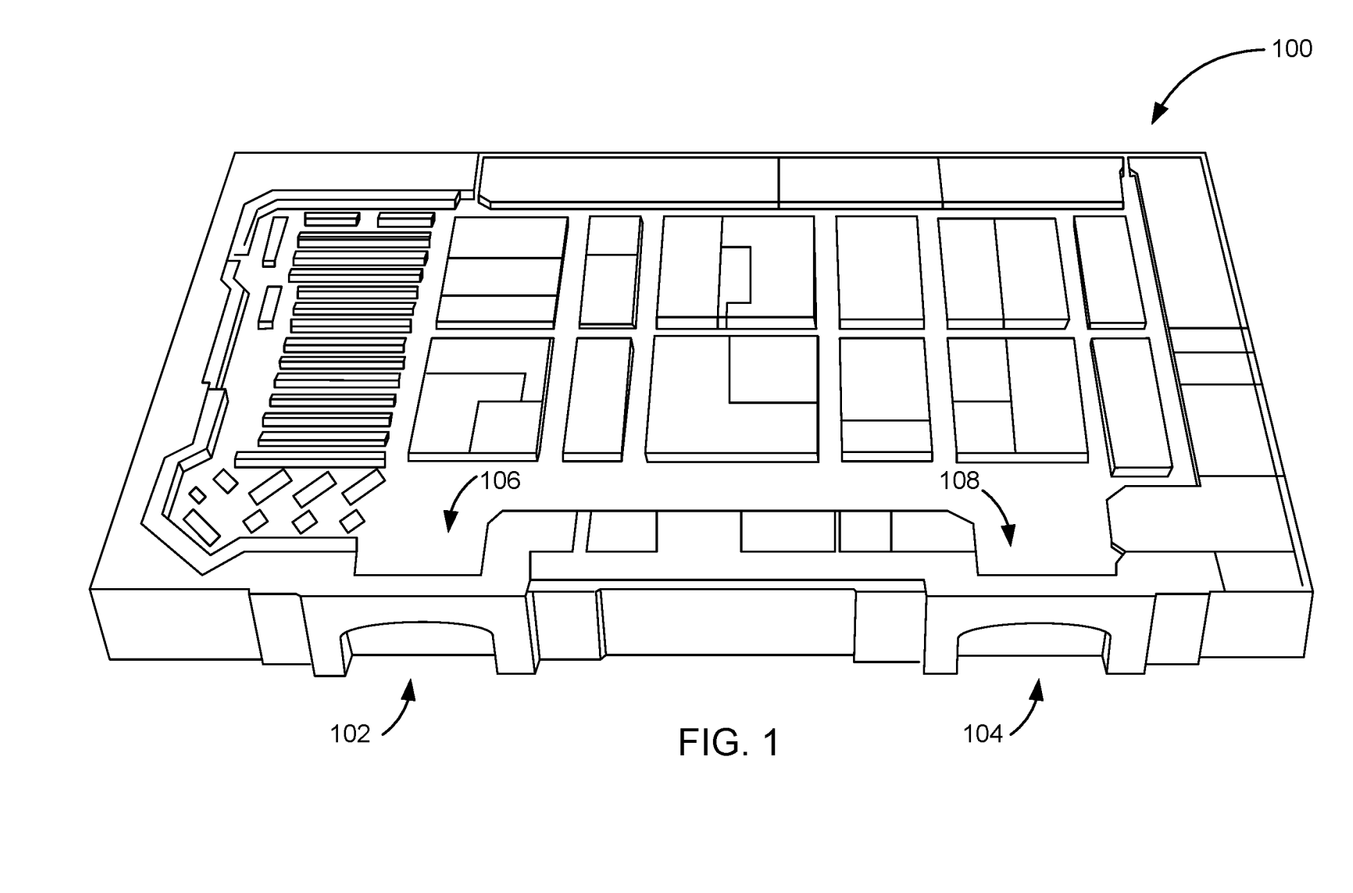
FIG. 1 is a diagram of a layout of a retail store.

FIG. 1 is a diagram of a layout of a brick and mortar retail store 100 that is one of a chain of multiple retail stores of a retail chain, where each retail store in the chain may or may not have different store layouts and planograms, which define where specific retail products are placed on retail shelves or retail display fixtures. Retail store 100 is divided into different departments and each department includes aisles of products categorized into that particular department. The departments can include various types of retail display fixtures, such as racks and gondolas containing shelves to display product. Each of these different types of retail display fixtures define aisles that shopping carts navigate through. Located inside the entrances 102 and 104 of retail store 100 are corrals of carts parked in areas 106 and 108. In these corrals an under one embodiment, the fleet of shopping carts equipped with 3D scanning equipment is intermixed with regular shopping carts. The number of shopping carts equipped with 3D scanning equipment is dependent upon the number of carts needed in the retail store, the size of the store and the number of customers the specific store services on a daily basis.

Figure 2:
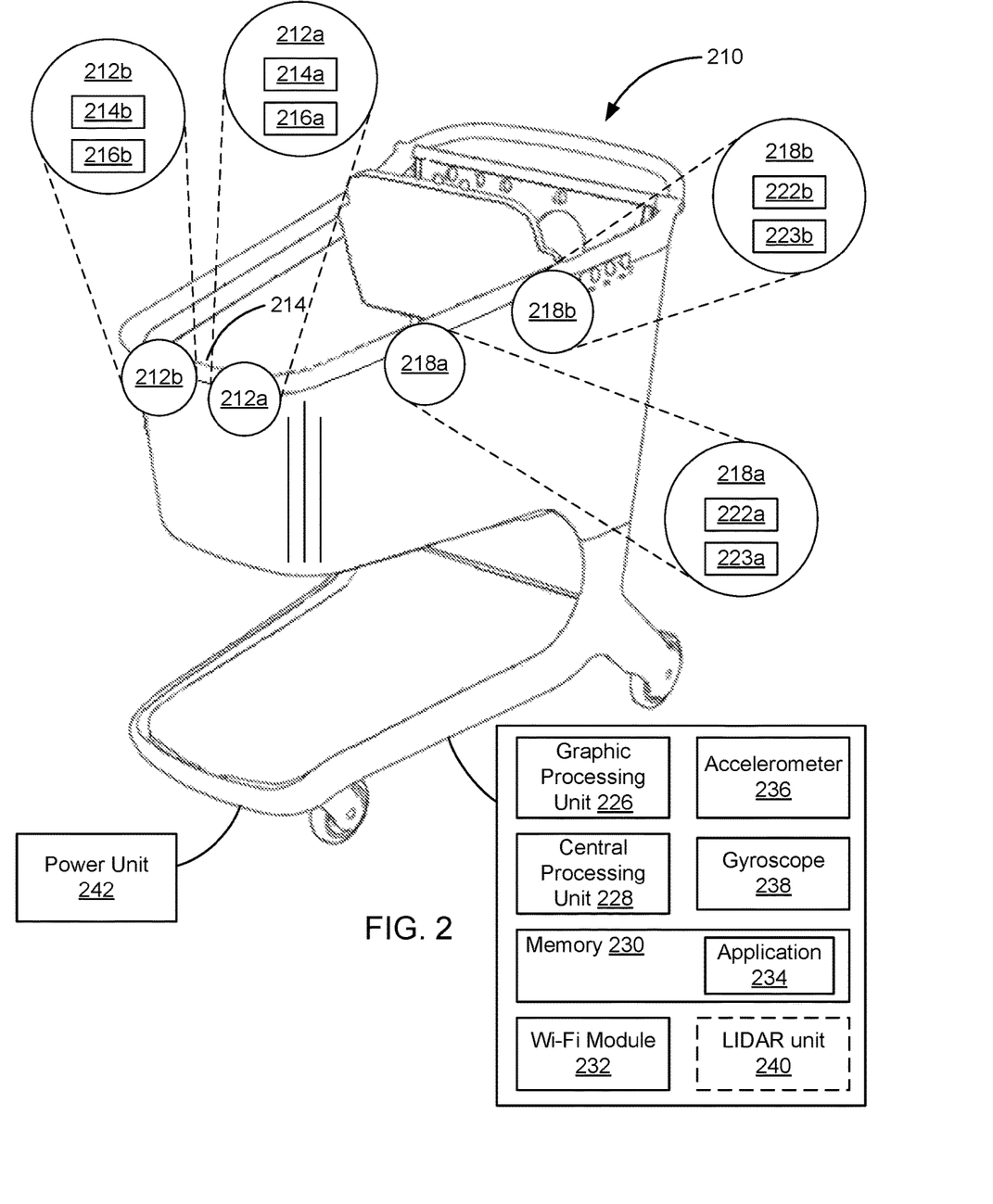
FIG. 2 is a block diagram illustrating representative 3D scanning components on board one of a plurality of 3D scanning shopping carts in accordance with one embodiment.

FIG. 2 is a block diagram illustrating representative 3D scanning components on board one of a plurality of 3D scanning shopping carts 210 in accordance with one embodiment. As previously described, intermixed among the regular shopping carts in a retail store is a fleet of 3D scanning shopping carts 210. Each 3D scanning shopping cart 210 is capable of intercommunicating with other 3D scanning shopping carts 210 by, for example, using a Wi-Fi network. In addition, each 3D scanning shopping cart 210 is capable of recognizing the location of the other 3D scanning shopping carts 210 in retail store 100 using an indoor positioning system and is capable of scanning the retail store during customer navigation using 3D scanners. 3D scanners are devices that analyze real-world objects or an environment to collect data regarding shape, depth and in some cases appearance (i.e., color). 3D scanning shopping cart 210 includes a plurality of 3D sensors and cameras. More specifically, each 3D scanning cart 210 includes a plurality of structured-light 3D cameras or scanners and at least one stereoscopic camera (i.e., a RGB-D camera).

In one embodiment and with reference to FIG. 2, the front of an exemplary shopping cart 210 includes a pair of front sensor pods or front sensor packages 212a and 212b that perform 3D scanning of objects and environment. Each pod or package 212a and 212b, includes a structured-light 3D camera 214a and 214b, which includes one infrared (IR) emitter for transmitting light and two infrared (IR) sensors for capturing infrared light. Structured-light 3D cameras sense the depth of objects or environment by emitting infrared light and capturing the infrared light after it is reflected off of the object or environment. Also included in each front sensor pod or package 212a and 212b is a stereoscopic camera 216a and 216b. Stereoscopic cameras 216a and 216b are an RGB camera that can sense color. In this embodiment, where 3D scanning equipment is located on the front of shopping cart 210, the first and second front sensor pods 212a and 212b would be mirror images of each other in terms of arrangement. The right sensor package 212a would include an arrangement from right to left of the IR emitter, next, the two IR sensors, and third, the stereoscopic camera. Accordingly, the left front sensor pod 212b would include an arrangement from right to left of the stereoscopic camera, the two IR sensors and the IR emitter.

Figure 3:
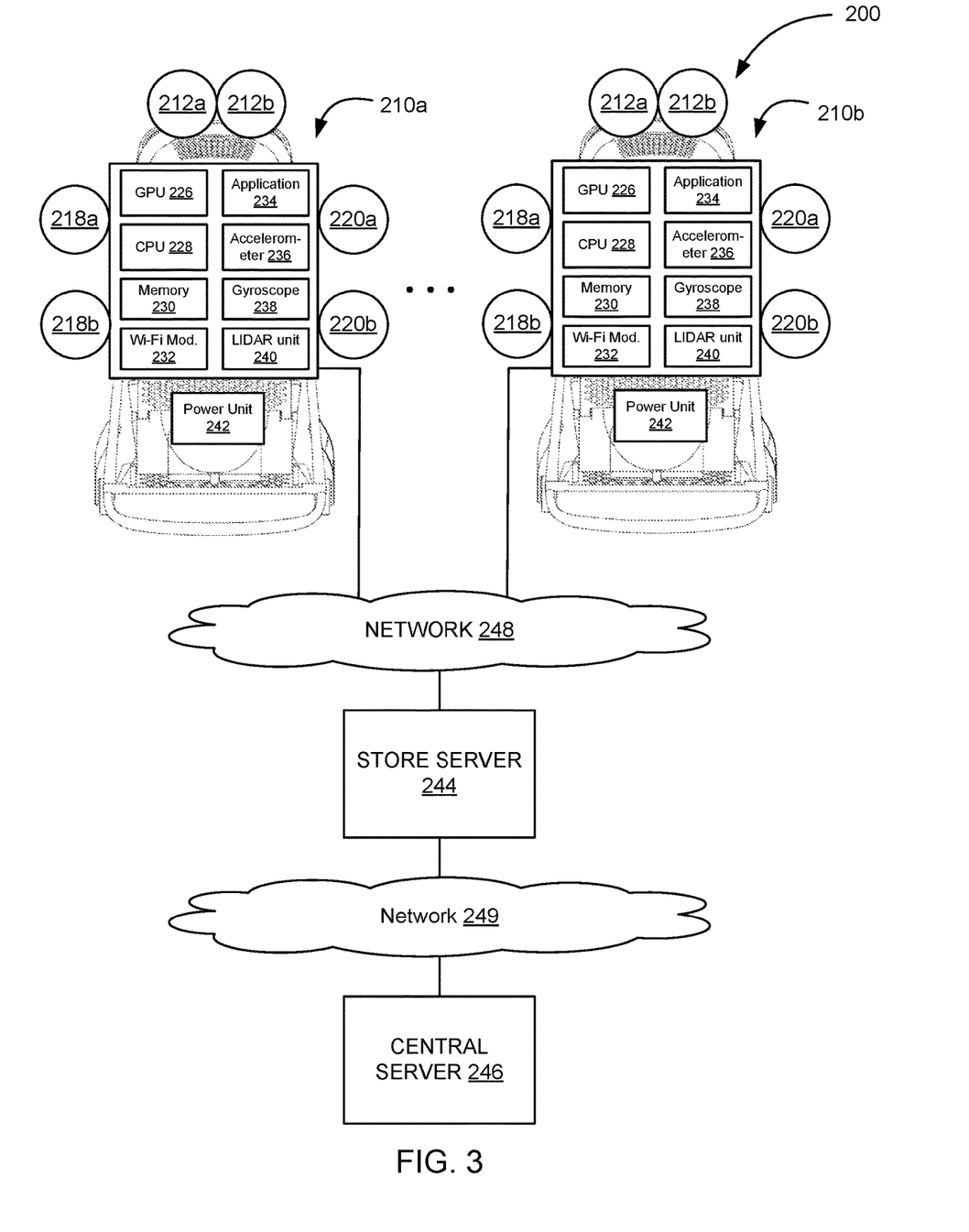
FIG. 3 is a block diagram illustrating a 3D scanning system for scanning a retail store in accordance with one embodiment.

In this embodiment, shopping cart 210 also includes a pair of right side sensor pods or right side sensor packages 218a and 218b and a pair of left side sensor pods or left side sensor packages 220a and 220b (shown in FIG. 3). The pair of right side sensor pods 218a and 218b each include an IR camera 222a and 222b and a visual camera with a dual fisheye lens 223a and 223b. The pair of left side sensor pods 220a and 220b (shown in FIG. 3) also each include an IR camera (not shown in FIGS. 2 and 3) and a visual cameral with a dual fisheye lens. Although not clearly shown in FIGS. 2 and 3 because FIGS. 2 and 3 are partially diagrammatic, sensor pods or packages 212a, 212b, 218a, 218b, 220a and 220b may be camouflaged into the cart and a customer, although pushing the cart and using the cart to fill with items from the retail store, may not be readily aware of the presence of cameras or sensors.

Optionally each of the 3D scanning shopping carts 210 can be equipped with a LIDAR unit 240. This unit can assist in autonomously driving the 3D scanning cart around the store.

Each of the 3D scanning shopping carts 210 further includes a graphic processing unit (GPU) 226, a central processing unit (CPU) 228, a memory 230 having application 234 to connect to a server, a communications or Wi-Fi module 232, an accelerometer 236 and a gyroscope 238 as well as a separate power unit 242 for powering the various equipment and components on board 3D scanning shopping cart 210. For example, power unit 242 may be a rechargeable battery or battery pack. In accordance with one embodiment, all of these components 226, 228, 230, 232, 234, 236, 238, 240 and 242 are mounted to the bottom of the cart and out of view from customers pushing cart 210.

FIG. 3 is a block diagram illustrating a 3D scanning system 200 for scanning a retail store in accordance with one embodiment. System 200 receives and stores 3D data gathered by a plurality of 3D scanning shopping carts, of which two such exemplary 3D scanning shopping carts include carts 210a and 210b. Besides receiving and storing 3D data, system 200 can construct 3D maps or models of many if not all retail stores in a chain of retail stores as long as a fleet of 3D scanning shopping carts are placed in each of those retail stores. In this way, if a customer wants to virtually shop in a specific and actual existing retail store, they can do so based on the constructed 3D maps or models.

System 100 includes a store server 244 in communication with a plurality of 3D scanning shopping carts 210a and 210b using network 248. 3D data is received from the plurality of 3D scanning shopping carts 210a and 210b and is off loaded by store server 244 to a central server 246 via a network 249. Central server 246 acts as a central repository of 3D maps or models of each store in a chain of retail stores to provide virtual shopping environments to customers. As previously discussed, not only do the components and hardware on board the 3D scanning carts collect and process data to generate a 3D map, but the 3D cameras regularly collect new data to update the 3D maps. In accordance with some embodiments, the 3D maps are updated several times per day.

Figure 4:
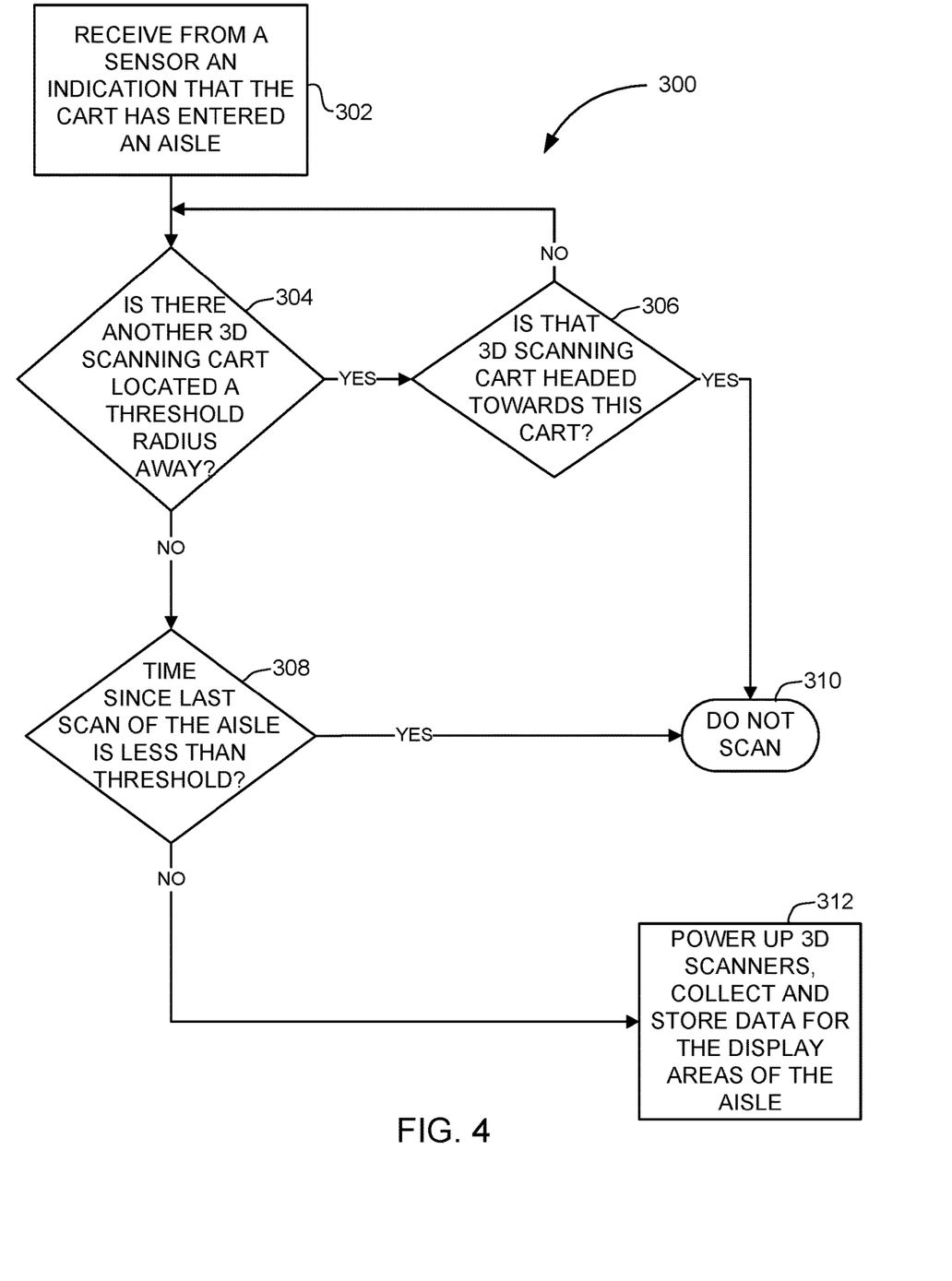
FIG. 4 is a flowchart illustrating representative steps when a shopping cart equipped with 3D scanning components scans a retail store in accordance with one embodiment.

FIG. 4 is a flowchart 300 illustrating representative steps performed by CPU 228 on each shopping cart equipped with 3D scanning components when scanning a retail store to generate a 3D map or model in accordance with one embodiment. The following steps illustrated in FIG. 4 will be described together with FIG. 5, which illustrates a top plan view of a portion of a retail store including a plurality of gondola display units 450, 452, 454, 456 and 458 where each side of each gondola comprises a display area P1, P2, P3, P4, P5, P6, P7, P8, P9 and P10, which faces a spaced apart aisle A1, A2, A3, A4, A5 and A6 for carts to maneuver within. To efficiently collect real-time data, method 300 begins at block 302 where CPU 228, such as CPU 228 located on board 3D scanning cart 210*a*, receives from a sensor an indication that cart 210*a* has entered an aisle, such as one of aisles A1-A6. At the beginning and end of each display area P1-P10 is a strip of Infrared illuminators 460*a* and 460*b*, 461*a* and 461*b*, 462*a* and 462*b*, 463*a* and 463*b*, 464*a* and 464*b*, 465*a* and 465*b*, 466*a* and 466*b*, 467*a* and 467*b*, 468*a* and 468*b* and 469*a* and 469*b* that act as electric beacons, where each marks a fixed location and allows the hardware aboard the 3D scanning shopping carts 210 to determine the cart's bearing. In one embodiment, the infrared beacons contain multiple lights arranged in a pattern. In one embodiment, each light pattern is indicative of a certain type of display area. For example, a two light pattern beacon may be indicative of all north to south oriented display areas and each three light pattern beacon may be indicative of all east to west oriented display areas.

In particular, each of the pair of right side sensor packages 218*a* and 218*b* and each of the pair of left side sensor packages 220*a* and 220*b* include IR cameras for sensing the strip of IR illuminators or IR beacon to determine bearing. Upon sensing the IR beacon, CPU 228 on board the cart recognizes the space to which it is entering and the specific display area or display areas that it will be 3D scanning. For example, the right side sensor packages 218*a* and 218*b* will sense the display area on one side of the cart and left side sensor packages 220*a* and 220*b* will sense the display area on the other side of the cart. In FIG. 4 and based on the location and direction cart 210*a* is pointing, right side sensor packages or pods 218*a* and 218*b* of cart 210*a* are sensing display area P2 and left side sensor packages 220*a* and 220*b* of cart 210*a* will be sensing display area P3.

Figure 5:
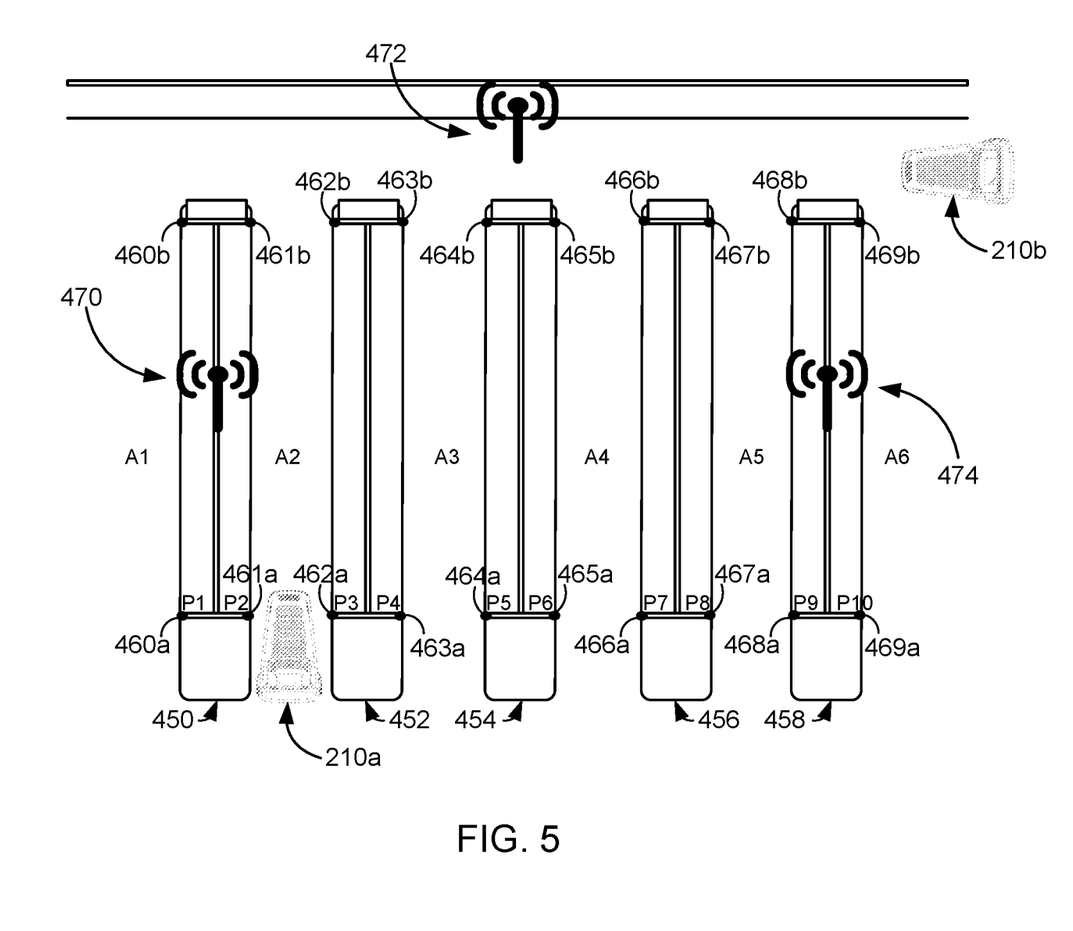
FIG. 5 is a top plan view of a portion of a retail store including a plurality of 3D scanning carts for illustrating the method in FIG. 4.

As soon as the 3D scanning cart 210*a* senses an infrared beacon, like infrared beacons 461*a* and 462*a*, CPU 228 knows which aisle in the store the cart has entered and proceeds to make a determination of whether this particular aisle should be 3D scanned. First, 3D scanning cart 210*a* communicates with the other carts in the fleet that also have 3D scanning capability to share its location and determine the locations of those other carts. Second, CPU 228 checks with store server 244 to determine when 3D data for the aisle was last collected.

In one embodiment, to determine location of other 3D scanning carts, Wi-Fi triangulation is used. As illustrated in FIG. 4, three Wi-Fi access points 470, 472 and 474 are illustrated within the portion of the retail store. Wi-Fi access points 470, 472 and 474 are important for determining and sharing cart locations, but are also important for shoppers to be able to use their smartphones while shopping without network or Internet interruption.

3D scanning carts, such as carts 210*a* and 210*b*, include Wi-Fi module 232, accelerometer 236 and gyroscope 238. Together these components are used to determine a position of a 3D scanning cart and a direction the cart is heading using Wi-Fi module 232, CPU 228 is capable of informing other 3D scanning carts about the cart's position and direction via network 248 and store server 244. In particular, a distance between the cart and at least three Wi-Fi access points 470, 472 and 474 is determined. This is accomplished by measuring the power present in a received Wi-Fi signal (i.e., Wi-Fi signal strength) from each of the Wi-Fi access points. With the known distance between the cart and the Wi-Fi access points, trilateration algorithms may be used to determine the relative position of the cart using the known positions of the access points as reference. Alternatively, the angle of arriving signals at the cart can be employed to determine the cart's location based on triangulation algorithms. A combination of both of these techniques may be used to increase the accuracy of the system. It should be realized that other indoor positioning systems are possible, including systems making use of optical, radio and acoustic technologies. When a location of the 3D scanning cart is determined it is sent and frequently updated to store server 244 to share with other 3D scanning carts.

At block 304 in FIG. 4, upon 3D scanning cart receiving location information for other 3D scanning carts, computer processor unit (CPU) 228 determines if any 3D scanning carts are within a certain distance from 3D scanning cart 210*a*. This determination is made by taking the position of 3D scanning cart 210*a* and determining if any other 3D scanning carts are within a threshold radius from 3D scanning cart 210*a*. For example, a threshold radius can be anywhere between 5 and 10 meters. If there is another 3D scanning cart located a threshold radius away, then method 300 proceeds to block 306 where CPU 228 determines if the 3D scanning cart that is within the threshold radius is headed in a direction towards cart 210*a*. If so, method 300 proceeds to block 310 and ends without scanning the aisle. The cart does not scan the aisle(s) it has entered because the 3D scanning cart that is heading toward it is currently scanning the display areas of the aisle. By not scanning the display areas again, power in cart 210*a* is conserved and repetitive data is not gathered. If, however, the other cart is not heading towards cart 210*a*, then method 300 passes back to block 304 to determine if there are any other carts within the threshold radius.

If no 3D scanning carts are located within the threshold radius or if there is another 3D scanning cart within the threshold radius but that cart is not headed towards cart 210*a*, then method 300 passes to block 308. At block 308, CPU 228 requests information from store server 244 regarding the aisle that cart 210*a* has entered. For example, in regards to FIG. 5, cart 210*a* requests information as to when the last time display areas P2 and P3 of aisle A2 were scanned. This data is stored in store server 244 with a timestamp. If an amount of time since the last scan is less than a threshold amount of time, then method 300 proceeds to block 310 and ends without scanning the display areas. For example, a threshold amount of time can be anywhere between 2 and 3 hours or even as little as 20 minutes. By only rescanning after the threshold amount of time has passed, the various embodiments conserve power on cart 210*a* and repetitive data is not gathered. If, however, an amount of time since the last scan is greater than the threshold amount of time, then method 300 proceeds to block 312. At block 312, CPU 228 instructs the 3D camera to power up to scan and GPU 226 begins to collect, analyze and store 3D data. In particular, front sensor packages 212*a* and 212*b* begin scanning display areas P2 and P3 using structured-light 3D cameras 214*a* and 214*b* and stereoscopic cameras 216*a* and 216*b*.

At the end of the aisle, strips of infrared illuminators or IR beacons 461*b* and 462*b* are also detected by right side sensor packages 218*a* and 218*b* and left side sensor packages 220*a* and 220*b* to indicate to CPU 228 that cart 210*a* is exiting the aisle. In particular, sensing the infrared illuminators or IR beacons at the end of the aisle causes CPU 228 to stop collecting data and for CPU 228 to instruct the 3D structured-light cameras and the stereoscopic cameras to power down. By turning off the 3D structured-light cameras and the stereoscopic cameras, power provided by power unit 242 can be conserved.

As 3D data is collected, GPU 226 processes and analyzes the 3D data to construct a 3D model of the display areas scanned by the cart. In particular, GPU 226 aligns multiple frames of 3D data and from the aligned frames forms a 3D model of the 3D space filled with objects captured in the 3D data. CPU 228 sends the 3D models to store server 244. From there, store server 244 compiles data from all 3D scanning carts located in the retail store into a 3D model or map of the entire retail store and sends the compiled data to central server 246 over network 249. Network 249 can comprise different types of computer networks including the Internet, LAN and WAN. Central server 246 is the repository for 3D models and maps of retail stores in a chain of retail stores and each 3D model or map is accessible by a customer so that they may select a 3D map or model of a particular store they would like to shop in and virtually shop in that store including adding items to a virtual shopping cart, purchasing those items and having them shipped to a different store in the chain of retail stores or to an address, such as a personal home address.

In another embodiment, 3D scanning system 200 includes an out-of-stock detection feature. Each cart 210*a* and 210*b* with 3D scanning capability are also equipped to detect out-of-stock events. Out-of-stock events are events where there is no product remaining on the shelf or the amount of a product on the shelf is low.

Figure 6:
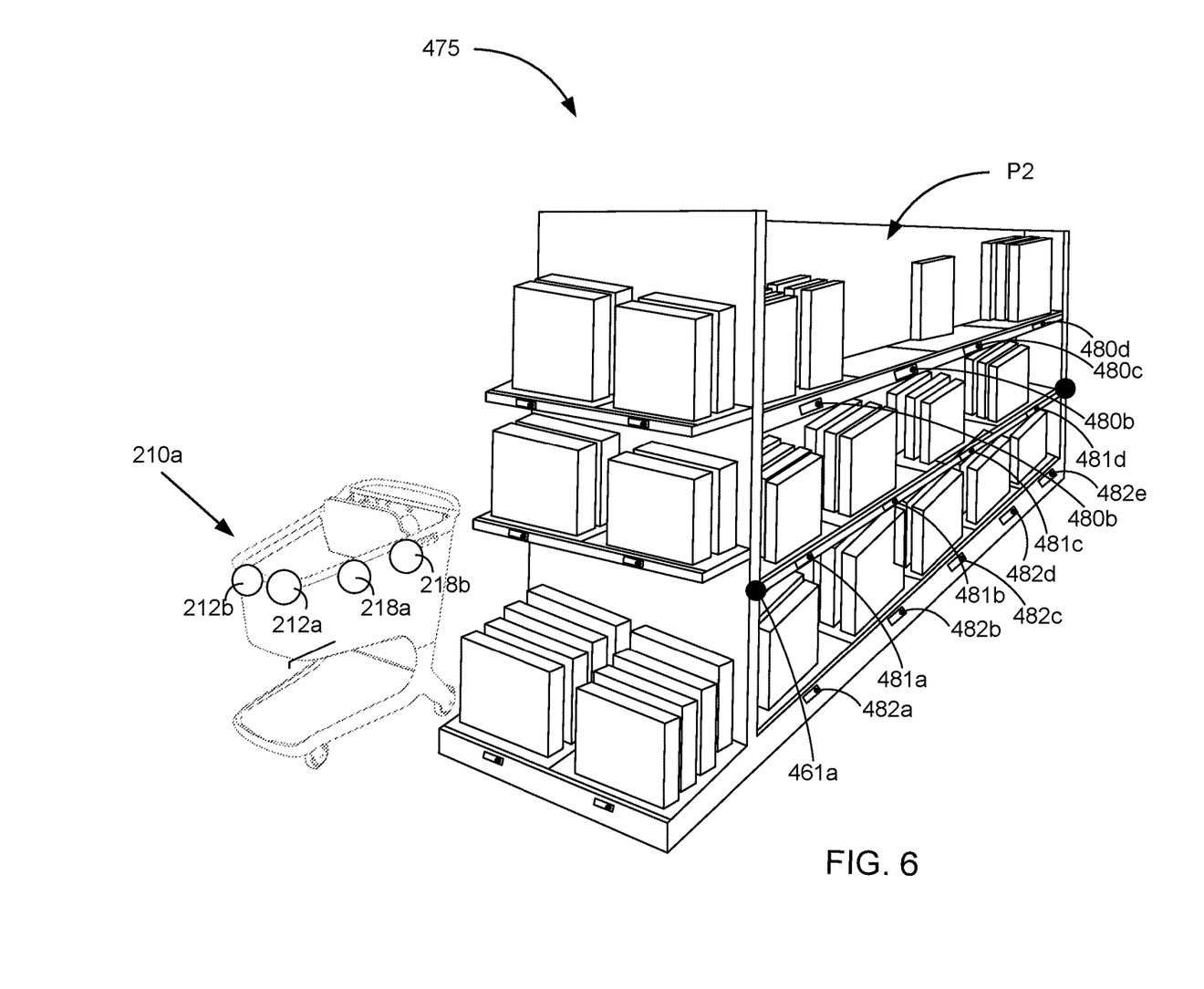
FIG. 6 is a perspective view of an aisle in a retail store including components for an out-of-stock feature in the 3D scanning system.

FIG. 6 is a perspective view of an aisle in a retail store including components for an out-of-stock feature in a 3D scanning system. In particular, FIG. 6 is a perspective view of a gondola display unit 475 illustrating a display area P2. Many retail stores display product on gondola display units which consist of a plurality of shelves mounted between uprights and having a back wall. In FIG. 6, display area P2 includes shelves of stocked product. In one embodiment, an infrared illuminator or IR light is placed on the front of the shelf next to or with the price label that contains information about the product and its price. In this way, each type of product sitting on the shelf has its own infrared illuminator or IR light 480*a-d* on the top shelf, 481*a-d* on the middle shelf, 482*a-e* on the bottom shelf. It should be realized that the infrared illuminator may be mounted to other portions of the gondola and may be triggered in many different ways to indicate that an item is out-of-stock.

In the embodiment illustrated in FIG. 6, each area where a type of product is set includes a weight sensor that senses the weight of the product on display. When the weight sensor senses that the product area is empty of product or at some low amount of product, the weight sensor triggers its corresponding infrared illuminator to turn on. Because the light from infrared illuminator is invisible to the human eye, the customer will not see the light, however, 3D scanning cart 210*a*, which includes right side sensing pods 218*a* and 218*b* having IR cameras 222*a* and 222*b* and left side sensing pods 220*a* and 220*b* also having IR cameras, will sense the infrared illuminator. This illuminator will have a different light pattern than the light pattern of the illuminators at each end of an aisle. For example, each illuminator 480*a-d*, 481*a-d* and 482*a-e* may be a single light. In another embodiment not illustrated, the products for a certain product type are all located in front of an infrared illuminator and will block the invisible light that is being constantly emitted from the infrared illuminator. When the last product is taken from the shelf and no other product blocks the illuminator, 3D scanning cart 210*a* will sense the infrared illuminator. In still another embodiment, computer vision can be used to detect when an item is out of stock. In this embodiment, a classifier model can be trained with images so that the system can detect an out of stock item and the type of item that is out of stock.

Upon sensing the infrared light, certain visual cameras having fish eye lenses on board 3D scanning cart 210*a* will take a zoomed out snapshot of the aisle and empty shelf. This zoomed out photo is sent to an in-store team member via store server 244 to notify them that the product is out of stock. A further advantage of taking a snapshot of the aisle, is to show whether other products in that same aisle or shelf are also being depleted. This will allow for more efficient restocking of all products. It is also possible for the cart to scan a barcode of the price label on the shelf where the emptied product is and send the bar code information to an in-store team member via store server 244.

As illustrated in FIG. 6, 3D scanning cart 210*a* may enter aisle A2 near IR beacon 461*a*, which will notify 3D scanning cart 210*a* which aisle it has entered. As cart 210*a* gets further down aisle A2, illuminator 480*b* will be on because the area directly behind it is empty of product. One of right side sensor pods 218*a* and 218*b* will sense the light radiating from illuminator 480*b*. A camera will zoom out and take a photo of the area. In this way, not only is a picture of the out-of-stock item sent to an in-store team member via store server 244, but the in-store team member will also notice that the item type next to the out-of-stock item also needs to be replenished since there is only one item left. The in-store team member can take care of both without having to wait for notification of its depletion later. This allows for more efficient restocking of all products. It is also possible for the cart to scan a barcode of the price label on the shelf where the emptied product is and send the bar code information to an in-store team member.

In additional embodiments, upon sensing that an item is out of stock, not only can a message be sent to in-store team members requesting that the out of stock item be replenished, but a message may also be sent to all 3D scanning carts in the fleet. The message may indicate what item is currently out of stock. In addition, the threshold time discussed in connection with FIG. 4 can be changed or reset to a more frequent threshold, so that other carts will continue scanning within the reset threshold time since last scan of the aisle looking for replenishment of the item until the item is replenished and such replenishment is recorded by a 3D scanning cart. As soon as the out of stock item is replenished, the threshold time may change back again to a less frequent threshold time or the default threshold time.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A scanning system for a retail store comprising:
a server;
a plurality of electronic beacons located in aisles in a select retail store, wherein a first electronic beacon is located at a first end of an aisle in the select retail store and a second electronic beacon is located at an opposing second end of the aisle in the select retail store; and
a plurality of shopping carts having on board 3D scanning components configured to scan items along aisles located in the select retail store, to collect and process 3D information and to transmit the 3d information to the server, each of the plurality of shopping carts including 3D camera configured to 3D scan, sensors configured to sense the electric beacons, at least one processor and a communications module configured to remotely communicate with the server; and
wherein the at least one processor is configured to collect the 3D information when the sensors sense the first or the second electric beacon in the aisle and is configured to stop collecting 3D information when the sensors sense the other of the first or the second electric beacon in the aisle; and
wherein the at least one processor is further configured to:
collect the 3D information in the aisle of the select retail store where there are no other shopping carts having on board 3D scanning components within a threshold radius from a position of the shopping cart and the 3D information has not been collected in the aisle for a threshold amount of time; or
collect the 3D information in the aisle of the select retail store where the position of the shopping cart having on board 3D scanning components is within a threshold radius from a position of a second shopping cart, but the second shopping cart that is located in the threshold radius from the shopping cart is heading in an opposite direction, and the 3D information has not been collected in the aisle for a threshold time; and
wherein the server is configured to gather the collected 3D information to generate and update a 3D model of the retail store, wherein the 3D model is publishable as a 3D virtual shopping environment of the select retail store and is accessible by customers to remotely shop in real time with a user device in the 3D virtual shopping environment of the select retail store.

2. The scanning system of claim 1, wherein each of the plurality of shopping carts further comprises an accelerometer, wherein the communication module and the accelerometer are used to determine the position of the shopping cart in the retail store and a direction in which the shopping cart is headed.

3. The scanning system of claim 2, wherein the communication module comprises a Wi-Fi module and the position of the shopping cart is determined by Wi-Fi trilateration or triangulation.

4. The scanning system of claim 1, further comprising a power unit located on board each of the plurality of carts having on board 3D scanning components and configured to power all of the components located on board.

5. The scanning system of claim 1, wherein the processor comprises a graphics processing unit and a central processing unit, wherein the graphics processing unit analyzes and consolidates scanned depths and the central processing unit is configured to make calculations and decisions.

6. The scanning system of claim 1, wherein some of the plurality of electric beacons further comprise infrared lights located in proximity to the different types of items in the aisles, each of the infrared lights are turned on upon a type of item being out-of-stock or low on stock.

7. The scanning system of claim 6, wherein each of the plurality of shopping carts comprises at least one visual camera, wherein when the sensors on the plurality of shopping carts sense the infrared light associated with the type of the item being out-of-stock or low on stock, the at least one visual camera takes a zoomed out photo and transmits the photo.

8. A method of scanning an aisle in a select retail store, the method comprising:
receiving from a sensor an indication that a first shopping cart having on board 3D scanning components has entered an aisle in the select retail store;
determining a distance that a second shopping cart having on board 3D scanning components is located from the first shopping cart having on board 3D scanning components;
determining a direction the second shopping cart is heading relative to the first shopping cart;
determining an amount of time that has occurred from when the at least one aisle was last 3D scanned;
programming a processor of the first shopping cart to 3D scan and collect 3D information when:
the distance between the second shopping cart and the first shopping cart is greater than a threshold radius from the first shopping cart and the amount of time since the aisle was last 3D scanned is greater than a threshold amount of time; or
the distance between the second shopping cart and the first shopping cart is within the threshold radius from the first shopping cart but the direction that the second shopping cart is heading is away from the first shopping cart and the amount of time when the aisle was last 3D scanned is greater than the threshold amount of time;
transmitting the 3D information to a server so that the server generates and updates a 3D model of the retail store based on the 3D information that is publishable as a 3D virtual shopping environment of the select retail store and is accessible by customers to remotely shop in real time with a user device in the 3D virtual shopping environment of the select retail store.

9. The method of claim 8, wherein receiving by a sensor an indication that a shopping cart having on board 3D scanning components has entered the aisle comprises sensing a pattern of infrared illuminators from an infrared beacon located on a display fixture at an end of the aisle.

10. The method of claim 8, further comprising ending the 3D scanning of the aisle when an indication is received by the sensor that the shopping cart having the 3D scanning components has exited the aisle.

11. The method of claim 10, wherein the indication received by the sensor comprises a pattern of infrared illuminators from an infrared beacon located on the display fixture at an opposing end of the aisle.

12. The method of claim 8, further comprising receiving from a sensor an indication that a type of item is out-of-stock or low on stock.

13. The method of claim 12, further comprising instructing a visual camera to take a photo of the type of item and its surrounding environment and transmitting the photo so that stock for the type of item and any low stock from surrounding items is replenished.

14. A method comprising:
providing a plurality of shopping carts in a select retail store that each have a plurality of on-board components including 3D cameras, sensors, at least one processor and a communications module, wherein each of the plurality of shopping carts is programmed to:

sense that the shopping cart has entered an aisle in the select retail store upon the sensors sensing a first electric beacon located at a first end of the aisle;

scan items located in the aisle with the plurality of on-board components including gathering 3D information with the on-board 3D cameras; and stop scanning items located in the aisle upon sensing a second electric beacon located at an opposing second end of the aisle in the select retail store; and wherein each of the plurality of shopping carts is further programmed to:

collect the 3D information in the aisle of the select retail store where there are no other shopping carts having on board 3D scanning components within a threshold radius from the shopping cart and the 3D information has not been collected in the aisle for a threshold amount of time; or collect the 3D information in the aisle of the select retail store where the shopping cart having on board 3D scanning components is within a threshold radius from a second shopping cart, but the second shopping cart that is located in the threshold radius from the shopping cart is heading in an opposite direction, and 3D information has not been collected in the aisle for a threshold time; and transmitting, by the shopping cart, the 3D information to a server, wherein the server is configured to generate and update a 3D model of the retail store and off load the 3D model to a repository that provides the 3D model as a 3D virtual shopping environment accessible by users to remotely shop in real time at the select retail store with a user device.

15. The method of claim 14, wherein scanning items located in the aisle with the plurality of on-board components further comprises scanning for a plurality of activated item electric beacons located in proximity to different types of items in the aisle, wherein each of the item electric beacons are activated upon the type of item being out-of-stock or low on stock.

16. The method of claim 15, further comprising taking photographs with at least one visual camera that is on-board the shopping cart when one of the electric item beacons are sensed, the visual camera takes a photograph of the type of item and its surrounding area and transmits the photograph to the store server so that stock is replenished.

* * * * *